(No Model.)
M. N. LOEHR.
MOLE TRAP.
No. 590,326. Patented Sept. 21, 1897.
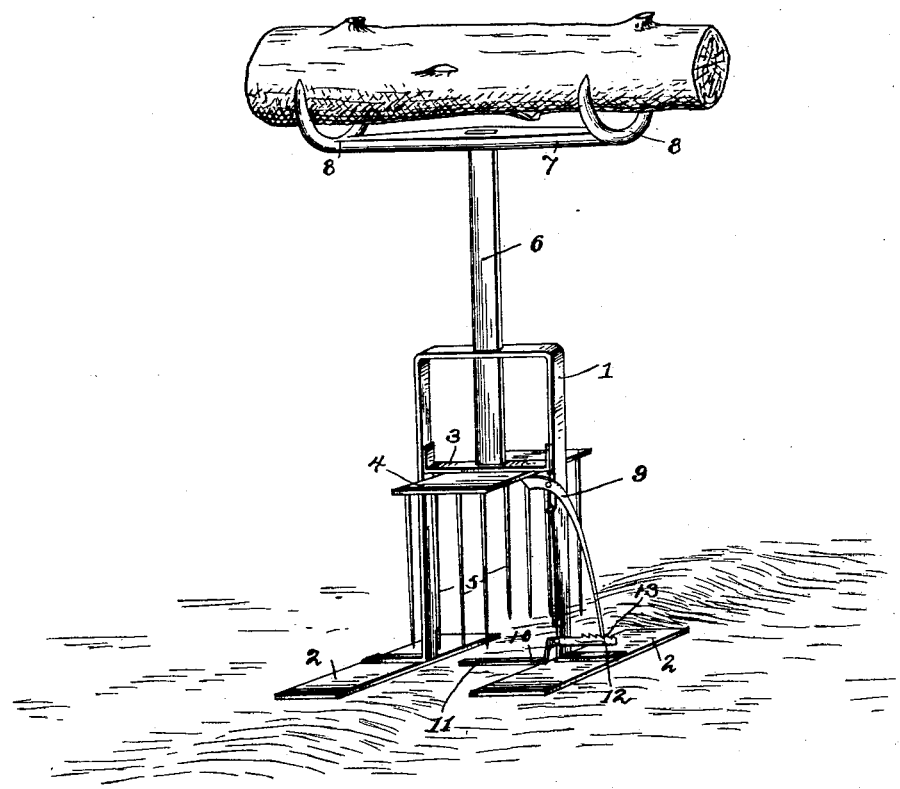
Witnesses:
Fenton S. Pelt.
J. A. Willson.
Inventor:
M. N. Loehr,
By H. B. Willson,
Attorney.

UNITED STATES PATENT OFFICE.

MINER N. LOEHR, OF PALESTINE, INDIANA, ASSIGNOR TO MILES E. LOEHR, OF SAME PLACE.

MOLE-TRAP.

SPECIFICATION forming part of Letters Patent No. 590,326, dated September 21, 1897.

Application filed June 3, 1897. Serial No. 639,281. (No model.)

*To all whom it may concern:*

Be it known that I, MINER N. LOEHR, a citizen of the United States, residing at Palestine, in the county of Kosciusko and State of Indiana, have invented certain new and useful Improvements in Mole-Traps; and I do declare the following to be a full, clear, and exact description of the invention, such as will enable others skilled in the art to which it appertains to make and use the same.

My invention has relation to mole-traps; and the object is to provide a simple, durable, and inexpensive trap of this character which will be positive in its operation and not be liable to get out of order.

With this object in view the invention consists in certain features of construction and combinations of parts, which will be hereinafter fully set forth.

In the accompanying drawing I have illustrated my invention in perspective.

1 denotes the supporting-frame, preferably rectangular in construction and provided with broad supporting-feet 2 and with a cross-bar 3.

4 denotes a spear-head having a series of downwardly-projecting spears 5 and a shank 6, which projects upwardly through holes in the frame and in the cross-piece and has a sliding engagement therewith. The upper end of this shank is provided with a cross-rod 7, having at its ends two curved bars 8, forming a cradle to receive a weight—such, for instance, as a log, as shown in the drawing.

9 denotes a lever pivoted to one of the side pieces of the frame and adapted at its upper end to hold the spear-head set.

10 denotes a trigger which is in the form of a bell-crank, the limb 11 of which is adapted to rest upon the ground, and the limb 12 of which is provided with a rack 13 to engage and hold the lower end of the lever.

In operation, as the mole burrows along under the soil he will lift the same, which operates the trigger and disengages it from the lower end of the lever, permitting the spear-head to drop with its weight and force the spears into the ground and into the body of the mole.

The device is exceedingly simple, may be made at small cost, and is easily operated.

Having thus described my invention, what I claim, and desire to secure by Letters Patent, is—

A mole-trap composed of a rectangular frame provided with flat supporting-feet and with a cross-bar, a spear-head, spears projecting downwardly therefrom, a shank secured to said spear-head and projecting upwardly through apertures in the cross-bar and frame, a cross-rod secured to the upper end of the shank and provided with arms 8 at the ends of the cross-rod, said arms being curved upward to support a weight, a lever pivoted to the frame to hold the spear-head in set position, and a crank-shaped trigger pivoted to the frame and having a rack-section with which the lower end of the lever engages, substantially as set forth.

In testimony whereof I hereunto affix my signature in presence of two witnesses.

MINER N. LOEHR.

Witnesses:
T. B. MENDEL,
W. M. MENDEL.